United States Patent [19]

Nelsson

[11] 4,104,938
[45] Aug. 8, 1978

[54] APPARATUS FOR KERFING GYPSUM WALLBOARD

[75] Inventor: Nels Nelsson, Des Plaines, Ill.

[73] Assignee: United States Gypsum Company, Chicago, Ill.

[21] Appl. No.: 771,223

[22] Filed: Feb. 23, 1977

Related U.S. Application Data

[62] Division of Ser. No. 580,435, May 23, 1975, abandoned.

[51] Int. Cl.² ............................................. B26D 3/06
[52] U.S. Cl. ........................................... 83/5; 144/82; 144/136 R
[58] Field of Search ................ 144/92 R, 82, 136 R; 83/5, 3

[56] References Cited

U.S. PATENT DOCUMENTS

| 1,044,904 | 11/1912 | Nelson | 144/82 |
| 2,153,307 | 4/1939 | Jansen | 83/5 |
| 2,203,447 | 6/1940 | Stavenhow | 83/5 |
| 3,060,980 | 10/1962 | Cook | 144/90 R |

*Primary Examiner*—J. M. Meister
*Attorney, Agent, or Firm*—Glenn W. Ohlson; Samuel Kurlandsky; Robert H. Robinson

[57] ABSTRACT

Disclosed is a gypsum wallboard panel having kerfing in opposing edges thereof which extends substantially the length of the edges but terminates prior to the corners of the panel a distance sufficient to prevent weakening of the corners of the panels.

1 Claim, 4 Drawing Figures

APPARATUS FOR KERFING GYPSUM WALLBOARD

This is a division of application Ser. No. 580,435, filed May 23, 1975, now abandoned.

BACKGROUND OF THE INVENTION

1. Field of the Invention

This invention relates to kerfed gypsum wallboard panels.

2. Description of the Prior Art

Kerfed gypsum wallboard panels are not new to the construction industry. In such panels, the kerfing comprises a slot running the length of the edges, usually the longer edges of the gypsum wallboard panels, and for attachment some type of clip or runner device is inserted into the kerfing with the runner device or clip being attached to some type of support structure, such as a slotted stud. Generally, gypsum wallboard panels having kerfed edges also have some type of hardening or strengthing in the kerfed outer edge portion. Such hardening or strengthening is well known in the gypsum wallboard panel industry and can be accomplished by numerous methods, such as addition or sugar solutions or other hardening materials to the outer edge portions during formation. In previous designs for kerfed gypsum wallboard panels, however, the kerfing has run the entire length of the edge portions, into and including the corner portions thereof, thereby causing a weakening of the corner portions. This weakening of the corner portions, caused by the kerfing, creates breakage at the corner portions thereby creating an undesirable feature in the panels.

Kerfing the center portion of the edge of construction materials is not new. U.S. Pat. No. 3,437,360, shows a siding material which is provided with a kerf which terminates short of the corner of the bottom of the siding, but the kerf of the siding panel extends all the way to and through the top corner thereof. While the top corner of the siding may well be covered so that breakage is not a key feature of the design, breakage nevertheless occurs, and if applied to gypsum wallboard panels where the corners thereof are exposed to view, the gypsum wallboard panels would be undesirable with that design. In U.S. Pat. No. 1,659,326, a frangible facing is attached by a back portion comprising metal sheathed lumber with the metal sheathed lumber being kerfed to accept an attachment device and with the kerfing terminating from the ends thereof. This patent, however, shows the attachment of panel systems without kerfing of the panel system and requires the expensive backup feature to make attachment through a kerfing feature. In German Pat. No. 636,334, a paving system is described using tongue and groove-like formation but having kerfing intermediate to the corners of hard tile and having a piece of wood inserted into the kerfing. In this case, however, a back portion of the edge is removed so that in addition to the kerfing, a laminate material can be placed in the back portion of the edge to absorb movement of the paving system to keep the facing portion thereof from breaking. This feature would be highly undesirable when applied to gypsum wallboard panels since it would create movement or separation of the seam when stress was applied to the panel, and the separation at the seam would make the wall created thereby have an unacceptable appearance.

The new and novel kerfed wallboard panels of this invention have kerfing at opposing edges thereof with the kerfing extending substantially the length of the edges, but terminating prior to the corners of the panel a distance sufficient to prevent weakening of the corners of the panels. The result of such a design is a gypsum wallboard panel having sufficient strength at the corners to prevent breakage under normal handling, but still having all of the advantages of a kerfed installation.

SUMMARY OF THE INVENTION

It is an object of this invention to provide a gypsum wallboard panel having kerfing at opposing edges thereof and having strengthened corner portions.

It is a further object of this invention to provide a wall system making use of kerfed gypsum wallboard panels.

It is an additional object of this invention to provide a method for providing new gypsum wallboard panels having kerfing at opposing edges of the panels and making use of strengthened corners in the panel.

The objects of this invention are accomplished by a gypsum wallboard panel having a kerf in at least one of two opposing edges thereof which extends substantially the length of the edges but terminating prior to the corners of the panel a distance sufficient to prevent weakening of the corners of the panels. While the kerf must terminate at a distance from the corner of the panel sufficient to prevent weakening of the corners of the panel, it has been found that a distance of about 2 or 3 inches from the corners of the panel is generally sufficient for this purpose. Additionally, it has been found that a design in the kerf which allows the terminating portions of the kerf to curve outward to the edge of the panel has some additonal benefits over a kerf that is terminated by straight lines forming sharp corners. The perferred gypsum wallboard panels used in the kerfing arrangement of this invention are those which have had the edges thereof hardened and strengthened by addition thereto of some type of hardening material. Conventional methods for hardening the edges are within the scope of this invention and include those wherein a sugar solution had been added to the edges thereof in production to harden the edges and create edges that are harder and stronger than the main body portions of the panel.

Additionally, the wall system of this invention comprises the combination including: a plurality of gypsum wallboard panels in abutting relationship along their vertical edges, each of said panels havin a kerf provided in at least one of two opposing edges thereof, each of said kerfs extending along substantially the entire length of the edge in which it is provided but terminating at each end short of the corners of the panel at a distance sufficient to prevent weakening of said corners;

means supporting said gypsum wallboard panels; and means attaching said panels to said supporting means by engaging the kerfed portions in the edges of said panels. As in the above discussion, the termination of the kerfing may be at any distance sufficient to prevent weakening of the corners of the panel, but it has been found that about 2 to 3 inches from the corners of the panel is a sufficient distance to terminate kerfing while maintaining strength in the corners. As in the above discussion, the termination of kerfing in a curved outward design is preferable to having the kerfing terminated by sharp corners formed by straight lines of cutting.

Additionally, included within this invention is a method for providing new gypsum wallboard panels comprising kerfing opposing edges of the panels laterally along the length thereof but terminating the kerfing from the corners of the panels a distance sufficient to prevent weakening of the corner of the panel.

Still further in addition, this invention includes a method for providing new gypsum wallboard panels comprising moving gypsum wallboard panels lengthwise along a moving conveyor and contacting a portion of the opposing edges of the panels, intermediate to the ends of the panels, with rotating circular saws to kerf the edges thereof substantially the length thereof while maintaining adjacent to the corners of the panels sufficient unkerfed portion to prevent weakening of the corners.

It may thus be seen that the new and novel gypsum wallboard panels of this invention take advantage of kerfing for installation and yet have sufficient unkerfed portions to overcome the undesirable weakening features found in conventional kerfed gypsum wallboard panels.

BRIEF DESCRIPTION OF THE DRAWINGS

This invention may be more fully described, but is not limited by the attached drawings wherein.

DESCRIPTION OF THE PREFERRED EMBODIMENTS

Figure 1:
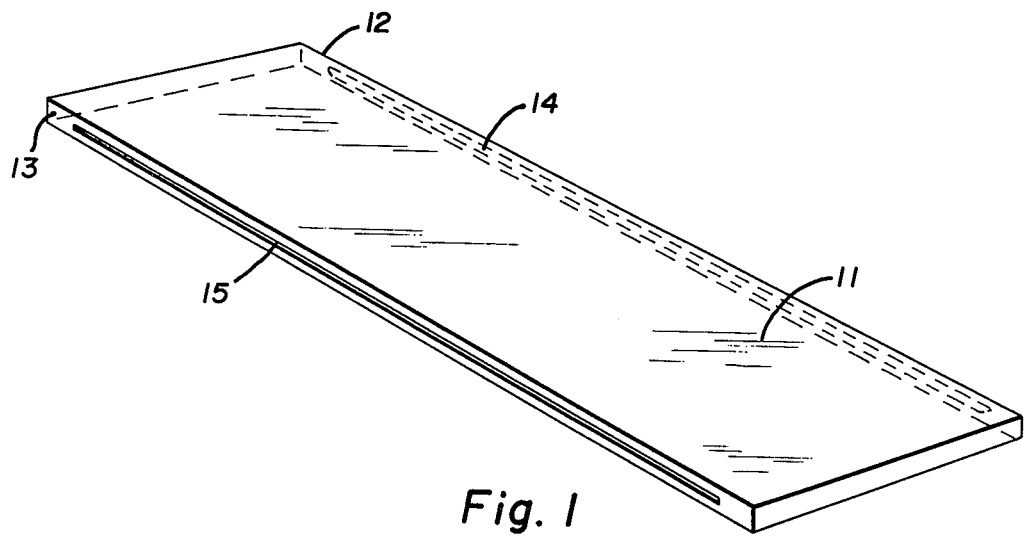
FIG. 1 is a perspective view of the kerfed gypsum wallboard panels of this invention.
Figure 2:
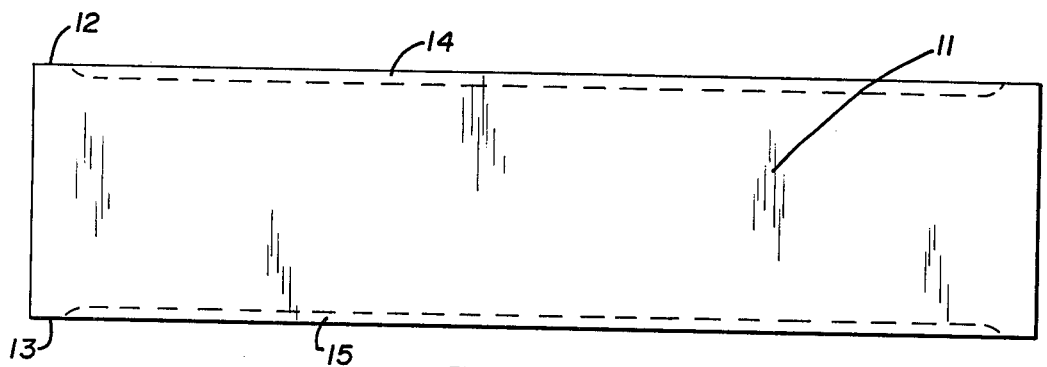
FIG. 2 is a top view thereof.

This invention may be more fully described, but is not limited by the attached drawings. Referring now to FIG. 1, numeral 11 refers to a gypsum wallboard panel. Opposing edges 12 and 13 have kerfs 14 and 15 which extend the length of the edge of the wallboard panel, but terminating a distance from the end or corner thereof sufficient to prevent weakening of the corner portions of the panel. This kerfing may extend substantially the length of the panel and terminate only 2 or 3 inches from the corner thereof, however, it may also terminate at any distance sufficient to prevent weakening of the corners of the panel so long as a substantial portion of the edges are kerfed. Additionally, it is preferred that the kerfing be such that the ends thereof curve outward to the edges of the panel rather than being in sharp corners formed by straight line cutting.

Figure 3:
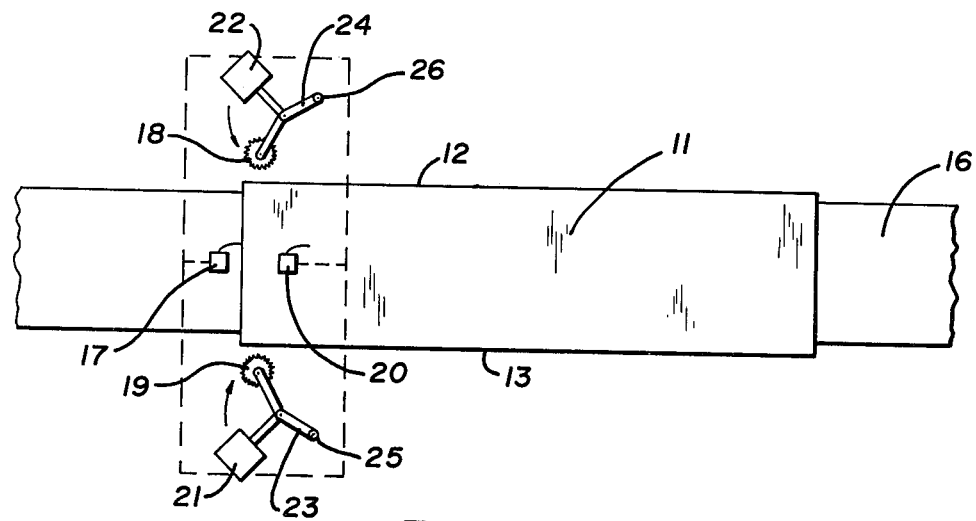
FIG. 3 is a top view of an apparatus useful in providing a method for kerfing gypsum wallboard panels.

In FIG. 3 an apparatus is shown for providing a method for kerfing the wallboard. A moving conveyor 16 moves the wallboard panel laterally along the conveyor where it engages a first sensing device 17 which activates rotating circular saws 18 and 19 causing them to move inward and engage the sides of the panel a distance removed from th corner thereof and then kerf the panel as it moves along the conveyor. As the panel passes a second sensing device 20, a second signal is sent to the rotating circular saws causing them to move outwardly and to discontinue kerfing of the panel prior to the saws reaching the ends and corners thereof. For purposes of illustration of this invention, the movement of the saws as shown is produced by pistons 21 and 22 causing arms 23 and 24 to move about pivot points 25 and 26. The actuation of the pistons is controlled by conventional electronic devices attached to the sensing devices 17 and 20.

Figure 4:
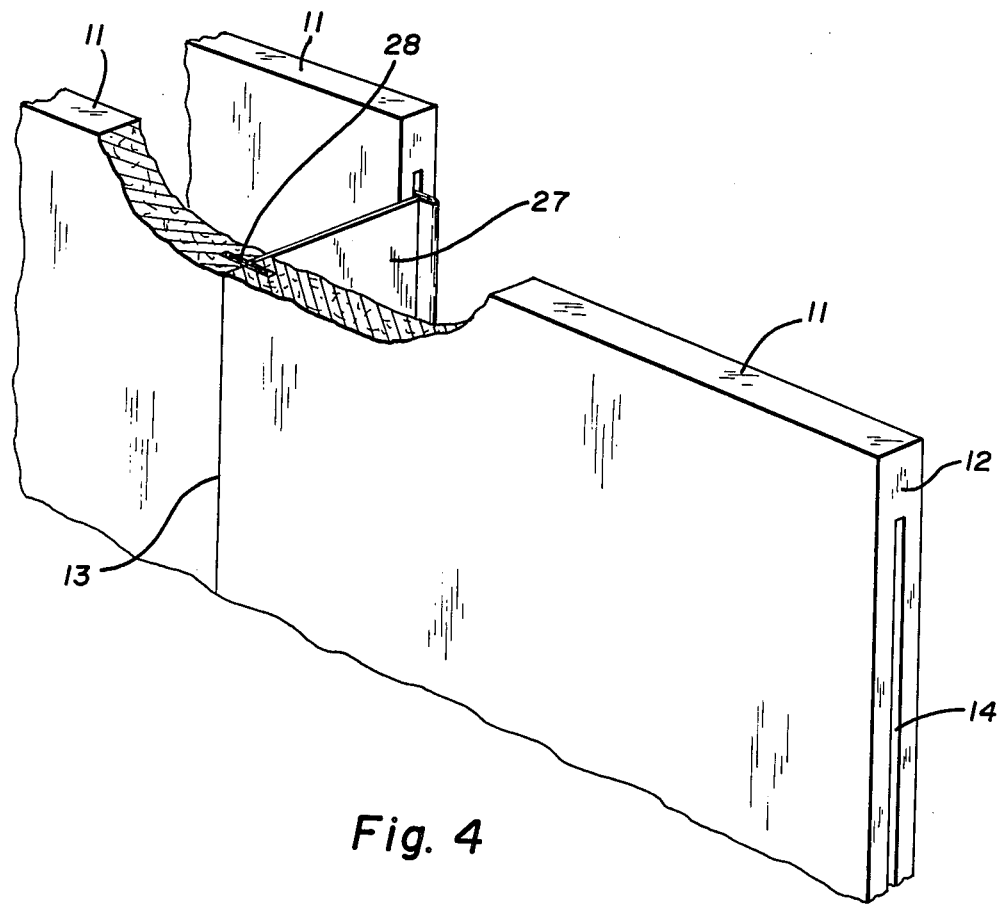
FIG. 4 is a perspective view of a wall system using kerfed wallboard panels.

In FIG. 4, a wall system is shown making use of kerfed wall panels according to this invention. A stud 27 is shown for supporting the wall system. The stud may have attached thereto a runner which engages the kerfs, with the runner then being attached to the stud. Alternatively, the stud may be designed so that it incorporates both the feature of means for supporting the system, and means for attaching the kerfed panels to the stud. In this case, an outward T portion 28 integrally designed into the stud accommodates the kerfed portion of the panels for attachement thereto. Each of the panels is engaged by this portion of the runner of the stud and is locked in place against outward movement.

The new and novel gypsum wallboard panels of this invention have all of the advantages of kerfed wallboard panels plus the added feature of having corner portions thereof which are not as susceptible to breaking as all designs heretofore known. This invention, therefore, provides a new and novel kerfed gypsum wallboard panel which has features superior to that known in the gypsum wallboard industry.

Having fully described this new and unique invention, the following is claimed:

1. An apparatus for kerfing gypsum wallboard panels along opposing edges thereof without kerfing the corners of the panels, said apparatus comprising: a moving conveyor for laterally moving gypsum wallboard panels; movable arms disposed adjacent to opposing edges of the conveyor having a free end and a pivotally mounted end; rotatable circular saws mounted on the movable arms at the end opposite the pivot end and disposed adjacent to opposing edges of the conveyor; piston means associated with the movable arms capable of rotating the arms about the pivot end; means for sensing the movement of panels on the conveyor and in timed relationship thereto thereby actuating the piston means to rotate the movable arms causing the rotatable saws to engage and kerf the edges of the panels after the leading corners thereof have passed at least inches beyond the point of contact with the saws; and means for sensing the movement of panels on the conveyor and in timed relationship thereto thereby actuating the piston means to rotate the movable arms in a reverse manner causing the rotatable saws to discontinue kerfing of the edges at least two (2) inches prior to kerfing the trailing corners of the panels.

* * * * *

UNITED STATES PATENT OFFICE
CERTIFICATE OF CORRECTION

Patent No. 4,104,938          Dated Aug. 8, 1978

Inventor(s) Nels Nelson

It is certified that error appears in the above-identified patent and that said Letters Patent are hereby corrected as shown below:

Col. 1, line 24, change "or" to "of".

Col. 3, line 59, change "th" to "the".

Col. 4, line 51, after "least" insert --two (2)--.

Signed and Sealed this

Twenty-sixth Day of June 1979

[SEAL]

Attest:

RUTH C. MASON
Attesting Officer

DONALD W. BANNER
Commissioner of Patents and Trademarks